US012670901B2

(12) United States Patent
Koneru et al.

(10) Patent No.: US 12,670,901 B2
(45) Date of Patent: Jun. 30, 2026

(54) SYSTEMS AND METHODS FOR USING CONTEXTUAL INTERIM RESPONSES IN CONVERSATIONS MANAGED BY A VIRTUAL ASSISTANT SERVER

(71) Applicant: Kore.ai, Inc., Orlando, FL (US)

(72) Inventors: Rajkumar Koneru, Windermere, FL (US); Prasanna Kumar Arikala Gunalan, Hyderabad (IN); Praveen Chandran Nair, Winter Garden, FL (US); Thirupathi Bandam, Hyderabad (IN)

(73) Assignee: KORE.AI, INC., Orlando, FL (US)

( * ) Notice: Subject to any disclaimer, the term of this patent is extended or adjusted under 35 U.S.C. 154(b) by 210 days.

(21) Appl. No.: 18/525,566

(22) Filed: Nov. 30, 2023

(65) Prior Publication Data

US 2025/0182751 A1 Jun. 5, 2025

(51) Int. Cl.

*G10L 15/183* (2013.01)
*G10L 13/10* (2013.01)
*G10L 15/18* (2013.01)
*G10L 15/22* (2006.01)
*G10L 15/30* (2013.01)

(52) U.S. Cl.

CPC ........ *G10L 15/183* (2013.01); *G10L 15/1815* (2013.01); *G10L 15/22* (2013.01); *G10L 15/30* (2013.01); *G10L 2013/105* (2013.01)

(58) Field of Classification Search

CPC . G10L 13/08; G10L 2013/105; G10L 15/183; G10L 15/1815; G10L 15/22; G10L 15/30
USPC .............................. 704/260, 270, 270.1, 275
See application file for complete search history.

(56) References Cited

U.S. PATENT DOCUMENTS

| | | | | |
|---|---|---|---|---|
| 11,086,858 | B1 * | 8/2021 | Koukoumidis | G06F 16/24575 |
| 11,245,646 | B1 * | 2/2022 | Koukoumidis | G06F 16/24578 |
| 2018/0357526 | A1 * | 12/2018 | Numata | G10L 13/027 |
| 2021/0090563 | A1 * | 3/2021 | Kim | G10L 15/22 |
| 2023/0074406 | A1 * | 3/2023 | Baeuml | G06F 16/90332 |

(Continued)

OTHER PUBLICATIONS

Yamazaki, Takato, et al. "An open-domain avatar chatbot by exploiting a large language model." Proceedings of the 24th Annual Meeting of the Special Interest Group on Discourse and Dialogue. Sep. 2023, pp. 428-432. (Year: 2023).*

*Primary Examiner* — James S Wozniak
(74) *Attorney, Agent, or Firm* — Troutman Pepper Locke LLP

(57) ABSTRACT

A virtual assistant server executes a dialog flow associated with a use case determined from a user utterance received from a user device to generate an actual response to the user utterance. The virtual assistant server provides a prompt to a large language model (LLM) comprising: one or more instructions to the LLM to generate a plurality of interim responses to be transmitted to the user device, and input data required by the LLM to generate the plurality of interim responses. The virtual assistant server transmits one or more of the plurality of interim responses received from the LLM to the user device in an order determined by the LLM until the actual response is generated. Subsequently, the virtual assistant server transmits the generated actual response to the user utterance to the user device after the one or more of the plurality of interim responses are transmitted to the user device.

24 Claims, 8 Drawing Sheets

(56) References Cited

U.S. PATENT DOCUMENTS

| | | | | |
|---|---|---|---|---|
| 2023/0260510 | A1* | 8/2023 | Vergyri | G10L 13/04<br>704/243 |
| 2024/0220067 | A1* | 7/2024 | Gelfenbeyn | G06F 3/04815 |
| 2024/0323332 | A1* | 9/2024 | Frayne | G06F 3/167 |
| 2024/0354514 | A1* | 10/2024 | Valstar | A61B 5/024 |
| 2024/0395246 | A1* | 11/2024 | Mcquinn | G10L 13/02 |
| 2024/0404514 | A1* | 12/2024 | Rollwage | A61B 5/4803 |
| 2025/0037711 | A1* | 1/2025 | Baeuml | G06F 40/35 |
| 2025/0095646 | A1* | 3/2025 | Tuinhof | G10L 15/08 |
| 2025/0097168 | A1* | 3/2025 | Goldshtein | G10L 13/00 |

* cited by examiner

Execute a dialog flow associated with a use case determined from a user utterance received from a user device associated with a user as part of a conversation between the user and a virtual assistant to generate an actual response to the user utterance

202

Provide a prompt to a large language model (LLM) comprising: one or more instructions to the LLM to generate a plurality of interim responses to be transmitted to the user device, and input data required by the LLM to generate the plurality of interim responses

204

Transmit one or more of the plurality of interim responses received from the LLM to the user device in an order determined by the LLM until the actual response is generated

206

Transmit the generated actual response to the user utterance to the user device subsequent to the transmitting the one or more of the plurality of interim responses to the user device

208

200

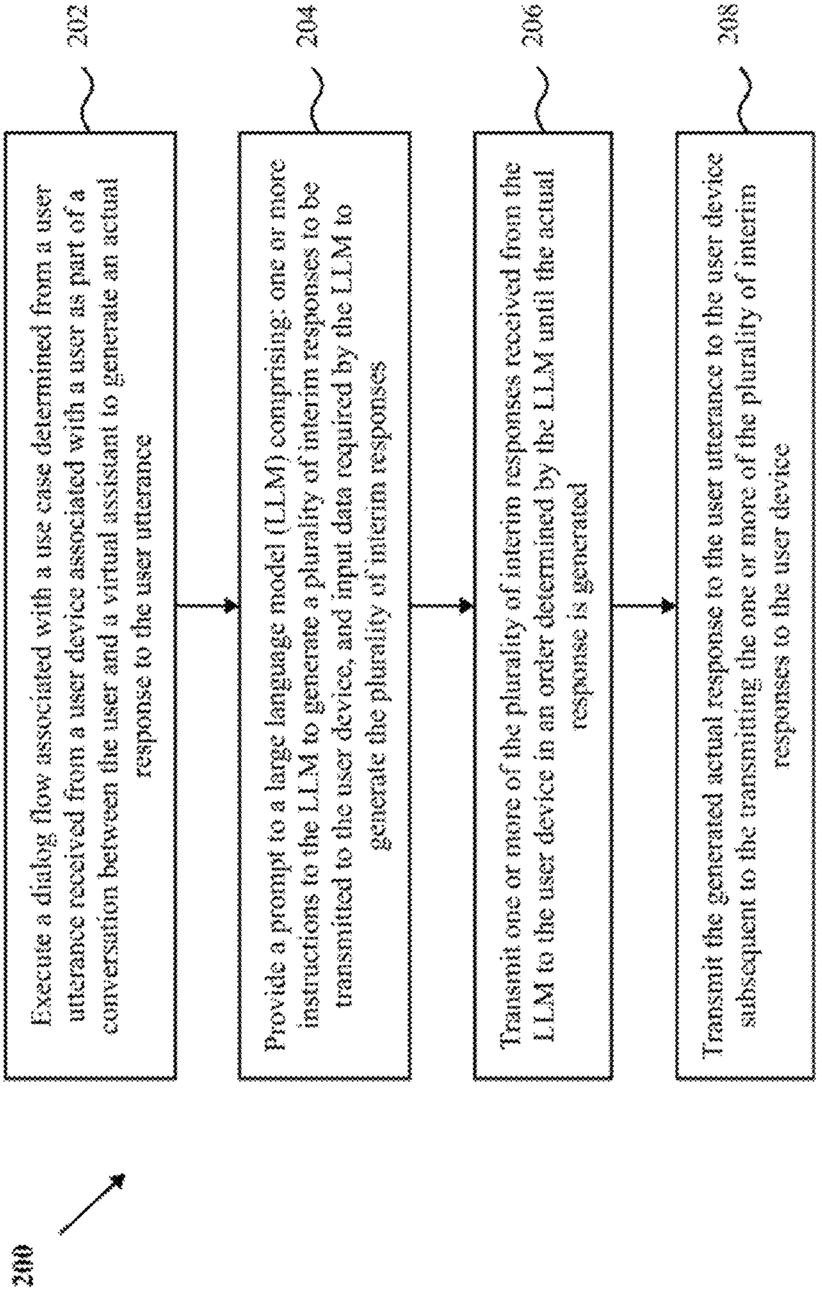

FIG. 2

| Use Case | Conversation State | Conversation State Process Description |
| --- | --- | --- |
| Installation schedule status check | Service node | 1. Retrieving the details of the assigned technician<br>2. Retrieving the current location and schedule of the assigned technician<br>3. Based on the current location and the schedule of the assigned technician, estimating when the assigned technician might reach the user's place for installation |
| Router diagnosis | Script node | 1. Pinging the router<br>2. Diagnosing the issue(s) based on the ping response |
| | Service node | Making a service call to a backend system to raise a service request to register the diagnosed issue |

FIG. 3A

| Prompt to the Fine-tuned Large Language Model | Expected Output from the Fine-tuned Large Language Model |
| --- | --- |
| A user is conversing with a virtual assistant. Generate three interim responses to be sent to the user when the virtual assistant is taking more time to generate an actual response. While generating the interim response, consider the given below use case, user sentiment, conversation transcript, conversation state, and the conversation state process description.<br><br>Use case: installation schedule status check<br>User sentiment: negative<br>Conversation state: installation_schedule_status_check_service node<br>Conversation state process description:<br>1. Retrieving the details of the assigned technician<br>2. Retrieving the current location and schedule of the assigned technician<br>3. Based on the current location and the schedule of the assigned technician, estimating when the assigned technician might reach the user's place for installation.<br><br>Conversation transcript:<br>User utterance: I had an installation scheduled for my internet connection at 4 PM today. It is already 4:30 PM now. Where is the technician? | Interim Response 1: We apologize for the delay in getting you the information you need. We are currently in the process of retrieving the details of the assigned technician to provide you with an accurate update on the technician's whereabouts.<br><br>Interim Response 2: Thank you for your patience. Please bear with us a little longer as we retrieve the current location and the schedule of the assigned technician.<br><br>Interim Response 3: We are now analyzing the current location and the schedule of the assigned technician to estimate when the assigned technician might reach your location for the installation. We will have an update for you shortly. |
| A user is conversing with a virtual assistant. Generate three interim responses to be sent to the user when the virtual assistant is taking more time to generate an actual response. While generating the interim response, consider the given below use case, user sentiment, conversation transcript, conversation state, and the conversation state process description.<br><br>Use case: router diagnosis<br>User sentiment: negative<br>Conversation state: router_diagnosis_script node<br>Conversation state process description:<br>1. Pinging the router<br>2. Diagnosing the issue(s) based on the ping response<br><br>Conversation transcript:<br>User utterance: I am facing connectivity issues. I want to raise a service request. | Interim Response 1: We are sorry to hear about the connectivity issues you're experiencing. Please bear with us while we run a diagnostic check on your router, which involves pinging the device to identify the root cause of the problem.<br><br>Interim Response 2: Thank you for your patience. We are currently analyzing the ping response from your router. This will help us pinpoint the issue and provide you with a more accurate solution.<br><br>Interim Response 3: This is taking longer than usual. We are actively working on identifying the issue affecting your connectivity. Your patience is greatly appreciated as we work to resolve this for you. |

FIG. 3B

SYSTEMS AND METHODS FOR USING CONTEXTUAL INTERIM RESPONSES IN CONVERSATIONS MANAGED BY A VIRTUAL ASSISTANT SERVER

FIELD OF THE INVENTION

This technology generally relates to virtual assistants and large language models, and more particularly to methods, systems, and computer-readable media for using interim responses in conversations managed by a virtual assistant server.

BACKGROUND

Conversational artificial intelligence (AI) systems have become a popular user touchpoint because of a wide range of tasks and the ease of interaction they offer. Users can converse with enterprise specific custom virtual assistants in natural language and fulfil their tasks. The tasks may include, for example, answering questions, retrieving information, real-time updates, user support, or the like. However, despite the advancements in the virtual assistant technology, there are certain limitations that often lead to disengagement and monotonous interactions between the users and the virtual assistants. For example, users may sometimes feel that conversations with the virtual assistants lack spontaneity and natural human-like flow, especially when the virtual assistants take more time to—analyze user requests, process the user requests, conduct backend operations such as, for example, answering from FAQs, searching and retrieving information from knowledge sources by making application programming interface (API) calls, or the like.

To address the aforementioned limitations and enhance user engagement with the virtual assistants, the concept of interim responses has been adapted by enterprises. An interim response serves as a temporary response that acknowledges a user's query or concern without providing a definitive solution or answer. The interim response may comprise: one or more phrases, one or more statements, or one or more comments that are sent to a user by a virtual assistant server during a conversation to maintain user's interest in the conversation and keep the user engaged while the actual response is generated to address the user's request. Traditionally, the interim responses are generated based on templates predefined by enterprise users such as, for example, virtual assistant developers, system administrators, or the like.

While the concept of interim responses holds great promise, traditional methods of generating the interim responses based on predefined templates pose certain disadvantages that limit the effectiveness of the interim responses such as, for example, lack of context sensitivity, robotic and predictable responses, limited personalization, lack of emotional expression, or the like. For example, traditional interim response templates are often static and do not consider conversation context, and user's emotion, as a result, the interim responses generated may be generic, repetitive, and may not be contextually relevant.

Hence, there is a need for systems and methods to generate and use contextually relevant interim responses in conversations between users and the virtual assistants managed by a virtual assistant server.

SUMMARY

In one example, the present disclosure relates to a method for generating and using interim responses in conversations managed by a virtual assistant server. The method implemented by the virtual assistant server comprises executing a dialog flow associated with a use case determined from a user utterance received from a user device associated with a user as part of a conversation between the user and a virtual assistant to generate an actual response to the user utterance. Further, the virtual assistant server provides a prompt to a large language model (LLM) comprising: one or more instructions to the LLM to generate a plurality of interim responses to be transmitted to the user device, and input data required by the LLM to generate the plurality of interim responses. Further, the virtual assistant server transmits one or more of the plurality of interim responses received from the LLM to the user device in an order determined by the LLM until the actual response is generated. Subsequently, the virtual assistant server transmits the generated actual response to the user utterance to the user device subsequent to the transmitting the one or more of the plurality of interim responses to the user device.

In another example, the present disclosure relates to a virtual assistant server comprising one or more processors and a memory. The memory coupled to the one or more processors which are configured to execute programmed instructions stored in the memory to execute a dialog flow associated with a use case determined from a user utterance received from a user device associated with a user as part of a conversation between the user and a virtual assistant to generate an actual response to the user utterance. Further, a prompt is provided to a large language model (LLM) comprising: one or more instructions to the LLM to generate a plurality of interim responses to be transmitted to the user device, and input data required by the LLM to generate the plurality of interim responses. Further, one or more of the plurality of interim responses received from the LLM are transmitted to the user device in an order determined by the LLM until the actual response is generated. Subsequently, the generated actual response is transmitted to the user utterance to the user device subsequent to the transmitting the one or more of the plurality of interim responses to the user device.

In another example, the present disclosure relates to a non-transitory computer readable storage medium storing thereon instructions which when executed by one or more processors, causes the one or more processors to execute a dialog flow associated with a use case determined from a user utterance received from a user device associated with a user as part of a conversation between the user and a virtual assistant to generate an actual response to the user utterance. Further, a prompt is provided to a large language model (LLM) comprising: one or more instructions to the LLM to generate a plurality of interim responses to be transmitted to the user device, and input data required by the LLM to generate the plurality of interim responses. Further, one or more of the plurality of interim responses received from the LLM are transmitted to the user device in an order determined by the LLM until the actual response is generated. Subsequently, the generated actual response is transmitted to the user utterance to the user device subsequent to the transmitting the one or more of the plurality of interim responses to the user device.

BRIEF DESCRIPTION OF THE DRAWINGS

FIG. 2 is a flowchart of an exemplary method for transmitting one or more interim responses to a user by the virtual assistant server of FIG. 1A during a conversation between the user and a virtual assistant.

FIG. 3A is a table illustrating exemplary process description for conversation states of dialog flows of use cases that may be provided by enterprise users while configuring the dialog flows of the use cases.

FIG. 3B is a table of exemplary training data that may be used for training a large language model illustrated in FIG. 1A to generate interim responses.

DETAILED DESCRIPTION

Examples of the present disclosure relate to a virtual assistant server environment 100 (illustrated in FIG. 1A) and, more particularly, to one or more components, systems, computer-readable media and methods for generating and using interim responses in conversations managed by a virtual assistant server. The virtual assistant server environment 100 enables developers or administrators of enterprises operating enterprise devices to, by way of example, design, develop, deploy, manage, host, and analyze virtual assistants. Further, the virtual assistant server environment 100 enables developers or administrators of the enterprises operating the enterprise devices to, by way of example, train, optimize and use large language models. A virtual assistant server 150 of the virtual assistant server environment 100 is configured to orchestrate and manage natural language conversations between users and virtual assistants.

Figure 1A:
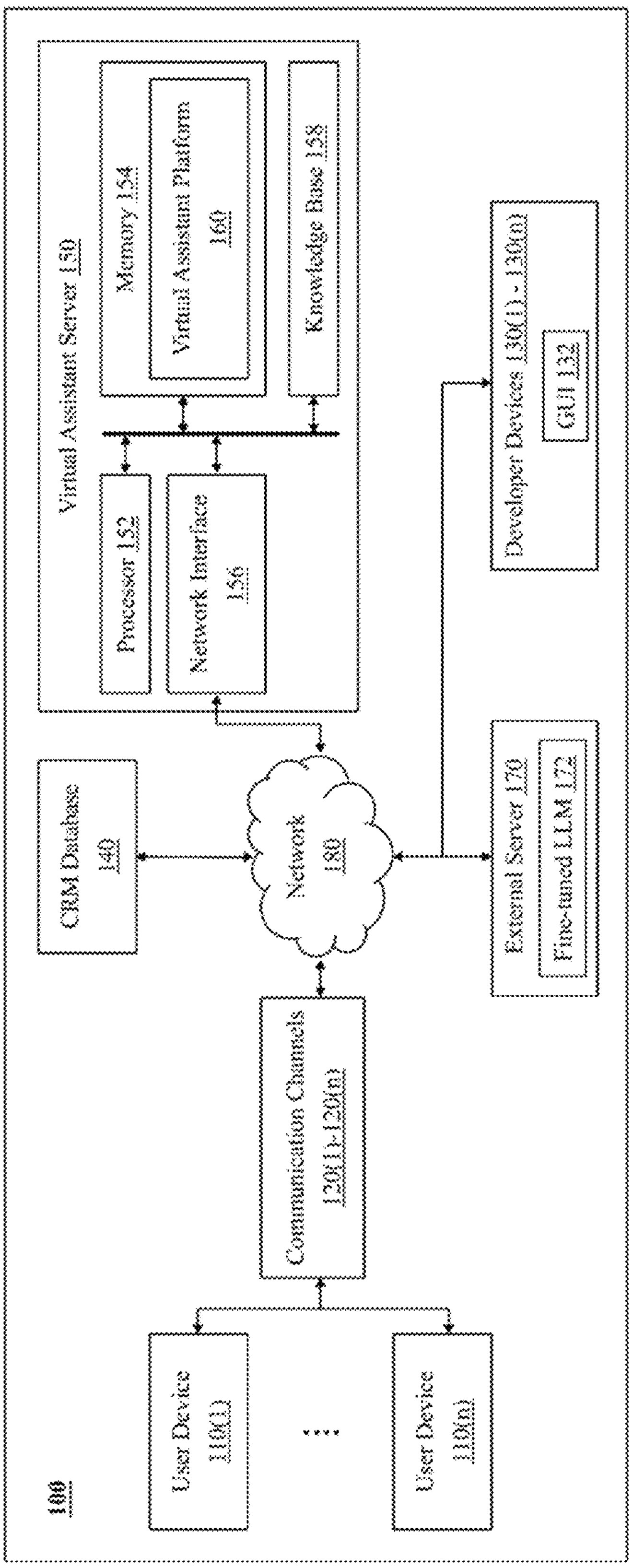
FIG. 1A is a block diagram of an exemplary virtual assistant server environment for implementing the concepts and technologies disclosed herein.

FIG. 1A is a block diagram of an exemplary virtual assistant server environment 100 for implementing the concepts and technologies disclosed herein. The environment 100 includes: one or more user devices 110(1)-110(*n*), a plurality of communication channels 120(1)-120(*n*), one or more developer devices 130(1)-130(*n*), a user relationship management (CRM) database 140, a virtual assistant server 150, and an external server 170, all coupled together via a network 180, although the environment 100 can include other types and numbers of systems, devices, components, and/or elements and in other topologies and deployments. Although not illustrated, the environment 100 may include additional network components, such as routers, switches, and other devices, which are well known to those of ordinary skill in the art and thus will not be described here.

The one or more user devices 110(1)-110(*n*) may comprise one or more processors, one or more memories, one or more input devices such as a keyboard, a mouse, a display device, a touch interface, and/or one or more communication interfaces, which may be coupled together by a bus or other link, although the one or more user devices 110(1)-110(*n*) may have other types and/or numbers of other systems, devices, components, and/or other elements. The users accessing the one or more user devices 110(1)-110(*n*) provide user utterances (e.g., in text, in voice, or in a combination of both text and voice) to the virtual assistant server 150. The virtual assistant server 150 processes the user utterances and provides responses to the user utterances. In one example, the virtual assistant server 150 communicates with the external server 170 to process and/or provide responses to the user utterances.

The one or more developer devices 130(1)-130(*n*) may communicate with the virtual assistant server 150 and/or the external server 170 via the network 180. The one or more developers at the one or more developer devices 130(1)-130(*n*) may access and interact with the functionalities exposed by the virtual assistant server 150 and/or the external server 170 via the one or more developer devices 130(1)-130(*n*). The one or more developer devices 130(1)-130(*n*) may include any type of computing device that can facilitate user interaction, for example, a desktop computer, a laptop computer, a tablet computer, a smartphone, a mobile phone, a wearable computing device, or any other type of device with communication and data exchange capabilities. The one or more developer devices 130(1)-130(*n*) may include software and hardware capable of communicating with the virtual assistant server 150 and/or the external server 170 via the network 180. Also, the one or more developer devices 130(1)-130(*n*) may comprise a graphical user interface (GUI) 132 to render and display the information received from the virtual assistant server 150 and/or the external server 170. The one or more developer devices 130(1)-130(*n*) may communicate with and the virtual assistant server 150 and/or the external server 170 via one or more application programming interfaces (APIs) or one or more hyperlinks exposed by the virtual assistant server 150 and/or the external server 170 respectively, although other types and/or numbers of communication methods may be used in other configurations.

The one or more developer devices 130(1)-130(*n*) may run applications, such as web browsers or virtual assistant software, which may render the GUI 132, although other types and/or numbers of applications may render the GUI 132 in other configurations. In one example, the one or more developers at the one or more developer devices 130(1)-130(*n*) may, by way of example, make selections, provide inputs using the GUI 132 or interact, by way of example, with data, icons, widgets, or other components displayed in the GUI 132.

The CRM database 140 may store the users information comprising at least one of profile details (e.g., name, address, phone numbers, gender, age, and occupation), communication channel preferences (e.g., text chat, SMS, voice chat, multimedia chat, social networking chat, web, and telephone call), language preferences, membership information (e.g., membership ID, and membership category), transaction data (e.g., communication session details such as: date, time, or the like), and past interactions data (such as sentiment, feedback, service ratings, or the like), although the CRM database 140 may store other types and numbers of user information in other configurations. The CRM database 140 may be updated dynamically or periodically based on the user conversations with the virtual assistant server 150. Although depicted as an external component in FIG. 1A, in one example, the CRM database 140 may be hosted and/or managed by the virtual assistant server 150.

The network 180 enables the one or more user devices 110(1)-110(*n*), the one or more developer devices 130(1)-130(*n*), the CRM database 140, or other such devices to communicate with the virtual assistant server 150. The network 180 may be, for example, an ad hoc network, an extranet, an intranet, a wide area network (WAN), a virtual private network (VPN), a local area network (LAN), a wireless LAN (WLAN), a wireless WAN (WWAN), a metropolitan area network (MAN), internet, a portion of the internet, a portion of the public switched telephone network (PSTN), a cellular telephone network, a wireless network, a Wi-Fi network, a worldwide interoperability for microwave access (WiMAX) network, or a combination of two or more such networks, although the network 180 may include other types and/or numbers of networks in other topologies or configurations.

The network 180 may support protocols such as, Session Initiation Protocol (SIP), Hypertext Transfer Protocol (HTTP), Hypertext Transfer Protocol Secure (HTTPS), Media Resource Control Protocol (MRCP), Real Time Transport Protocol (RTP), Real-Time Streaming Protocol (RTSP), Real-Time Transport Control Protocol (RTCP), Session Description Protocol (SDP), Web Real-Time Communication (WebRTC), Transmission Control Protocol/Internet Protocol (TCP/IP), User Datagram Protocol (UDP), or Voice over Internet Protocol (VOIP), although other types and/or numbers of protocols may be supported in other topologies or configurations. The network 180 may also support standards or formats such as, for example, hypertext markup language (HTML), extensible markup language (XML), voiceXML, call control extensible markup language (CCXML), JavaScript object notation (JSON), although other types and/or numbers of data, media, and document standards and formats may be supported in other topologies or configurations. The network interface 156 of the virtual assistant server 150 may include any interface that is suitable to connect with any of the above-mentioned network types and communicate using any of the above-mentioned network protocols, standards, or formats.

The external server 170 may host and/or manage a fine-tuned large language model (LLM) 172. In one example, one or more developers via the one or more developer devices 130(1)-**130(*n*) may train a general purpose LLM with enterprise specific data or one or more domain specific data to generate a fine-tuned LLM 172 for enterprise specific use cases and/or one or more domains. Although not illustrated, the external server 170 may host and/or manage a plurality of LLMs which may be pre-trained general purpose LLMs or fine-tuned LLMs for an enterprise or the one or more domains. The external server 170 may be a cloud-based server or an on-premises server. The fine-tuned LLM 172 may be accessed using an application programming interface (API) for use in applications. In another example, the fine-tuned LLM 172 may be hosted by the external server 170 and managed remotely by the virtual assistant server 150. In another example, the fine-tuned LLM 172 may be hosted and/or managed by the virtual assistant server 150**.

An LLM is a type of artificial intelligence-machine learning (AI/ML) model that is used to process natural language data for tasks such as natural language processing, text mining, text classification, machine translation, question-answering, response generation, or the like. The LLM uses deep learning or neural networks to learn language features from large amounts of data. The LLM is, for example, trained on a large dataset and then used to generate predictions or generate features from unseen data. The LLM can be used to generate language features such as word embeddings, part-of-speech tags, named entity recognition, sentiment analysis, or the like. Unlike traditional rule-based NLP systems, the LLM does not rely on pre-defined rules or templates to generate responses. Instead, the LLM uses a probabilistic approach to language generation, where the LLM calculates the probability of each word in a response based on the patterns the LLM learned from the training data.

The virtual assistant server 150 includes a processor 152, a memory 154, a network interface 156, and a knowledge base 158, although the virtual assistant server 150 may include other types and/or numbers of components in other configurations. In addition, the virtual assistant server 150 may include an operating system (not shown). In one example, the virtual assistant server 150, one or more components of the virtual assistant server 150, and/or one or more processes performed by the virtual assistant server 150 may be implemented using a networking environment (e.g., cloud computing environment). In one example, the capabilities of the virtual assistant server 150 may be offered as a service using the cloud computing environment.

The components of the virtual assistant server 150 may be coupled by a graphics bus, a memory bus, an Industry Standard Architecture (ISA) bus, an Extended Industry Standard Architecture (EISA) bus, a Micro Channel Architecture (MCA) bus, a Video Electronics Standards Association (VESA) Local bus, a Peripheral Component Interconnect (PCI) bus, a PCI-Express (PCIe) bus, a serial advanced technology attachment (SATA) bus, a Personal Computer Memory Card Industry Association (PCMCIA) bus, an Small Computer Systems Interface (SCSI) bus, or a combination of two or more of these, although other types and/or numbers of buses may be used in other configurations.

The processor 152 of the virtual assistant server 150 may execute one or more computer-executable instructions stored in the memory 154 for the methods illustrated and described with reference to the examples herein, although the processor 152 may execute other types and numbers of instructions and perform other types and numbers of operations. The processor 152 may comprise one or more central processing units (CPUs), or general-purpose processors with a plurality of processing cores, such as Intel® processor(s), AMD® processor(s), although other types of processor(s) could be used in other configurations. Although the virtual assistant server 150 may comprise multiple processors, only a single processor (i.e., the processor 152) is illustrated in FIG. 1A for simplicity.

The memory 154 of the virtual assistant server 150 is an example of a non-transitory computer readable storage medium capable of storing information or instructions for the processor 152 to operate on. The instructions, which when executed by the processor 152, perform one or more of the disclosed examples. In one example, the memory 154 may be a random access memory (RAM), a dynamic random access memory (DRAM), a static random access memory (SRAM), a persistent memory (PMEM), a nonvolatile dual in-line memory module (NVDIMM), a hard disk drive (HDD), a read only memory (ROM), an erasable programmable read-only memory (EPROM), an electrically erasable programmable read-only memory (EEPROM), a programmable ROM (PROM), a flash memory, a compact disc (CD), a digital video disc (DVD), a magnetic disk, a universal serial bus (USB) memory card, a memory stick, or a combination of two or more of these. It may be understood that the memory 154 may include other electronic, magnetic, optical, electromagnetic, infrared or semiconductor based non-transitory computer readable storage medium which may be used to tangibly store instructions, which when executed by the processor 152, perform the disclosed examples. The non-transitory computer readable medium is not a transitory signal per se and is any tangible medium that contains and stores the instructions for use by or in connection with an instruction execution system, apparatus, or device. Examples of the programmed instructions and steps stored in the memory 154 are illustrated and described by way of the description and examples herein.

As illustrated in FIG. 1A, the memory 154 may include instructions corresponding to a virtual assistant platform 160 of the virtual assistant server 150, although other types and/or numbers of instructions in the form of programs, functions, methods, procedures, definitions, subroutines, or modules may be stored. The memory 154 may also include data structures storing information corresponding to the virtual assistant platform 160. The virtual assistant server 150 receives user utterances from the one or more users at the one or more user devices 110(1)-110(*n*) and/or the one or more developers at the one or more developer devices 130(1)-130(*n*) and uses the virtual assistant platform 160 to provide responses to the received user utterances.

The network interface 156 may include hardware, software, or a combination of hardware and software, enabling the virtual assistant server 150 to communicate with the components illustrated in the environment 100, although the network interface 156 may enable communication with other types and/or number of components in other configurations. In one example, the network interface 156 provides interfaces between the virtual assistant server 150 and the network 180. The network interface 156 may support wired or wireless communication. In one example, the network interface 156 may include an Ethernet adapter or a wireless network adapter to communicate with the network 180.

The users at the one or more user devices 110(1)-110(*n*) may access and interact with the functionalities exposed by the virtual assistant server 150 via the network 180. The one or more user devices 110(1)-110(*n*) may include any type of computing device that can facilitate user interaction, for example, a desktop computer, a laptop computer, a tablet computer, a smartphone, a mobile phone, a wearable computing device, or any other type of device with communication and data exchange capabilities. The one or more user devices 110(1)-110(*n*) may include software and hardware capable of communicating with the virtual assistant server 150 via the network 180. Also, the one or more user devices 110(1)-110(*n*) may render and display the information received from the virtual assistant server 150. The one or more user devices 110(1)-110(*n*) may render an interface of the one or more communication channels 120(1)-120(*n*) which the users may use to interact with the virtual assistant server 150.

The users at the one or more user devices 110(1)-110(*n*) may interact with the virtual assistant server 150 via the network 180 by providing text utterances, voice utterances, or a combination of text and voice utterances via the one or more communication channels 120(1)-120(*n*). The one or more communication channels 120(1)-120(*n*) may include channels such as, enterprise messengers (e.g., Skype for Business, Microsoft Teams, Kore.ai Messenger, Slack, Google Hangouts, or the like), social messengers (e.g., Facebook Messenger, WhatsApp Business Messaging, Twitter, Lines, Telegram, or the like), web & mobile channels (e.g., a web application, a mobile application), interactive voice response (IVR) channels, voice channels (e.g., Google Assistant, Amazon Alexa, or the like), live chat channels (e.g., LivePerson, LiveChat, Zendesk Chat, Zoho Desk, or the like), a webhook channel, a short messaging service (SMS), email, a software-as-a-service (SaaS) application, voice over internet protocol (VOIP) calls, computer telephony calls, or the like. It may be understood that to support voice-based communication channels, the environment 100 may include, for example, a public switched telephone network (PSTN), a voice server, a text-to-speech (TTS) engine, and/or an automatic speech recognition (ASR) engine.

The knowledge base 158 of the virtual assistant server 150 may comprise one or more enterprise-specific databases that may comprise enterprise information such as, for example, products and services, business rules, and/or conversation rules, in the form of, for example, frequently asked questions (FAQs), online content (e.g., articles, books, magazines, PDFs, web pages, product menu, services menu), audio-video data, or graphical data that may be organized as relational data, tabular data, knowledge graph, or the like. The knowledge base 158 may be accessed by the virtual assistant platform 160 while handling user conversations. The developers at the one or more developer devices 130(1)-130(*n*) may search the knowledge base 158, for example, using the GUI 132, although other manners for interacting with the knowledge base 158 may be used. The knowledge base 158 may be dynamically updated. The knowledge base 158 may comprise a number of different databases, some of which may be internal or external to the virtual assistant server 150. Although there may be multiple databases, a single knowledge base 158 is illustrated in FIG. 1A for simplicity.

Figure 1B:
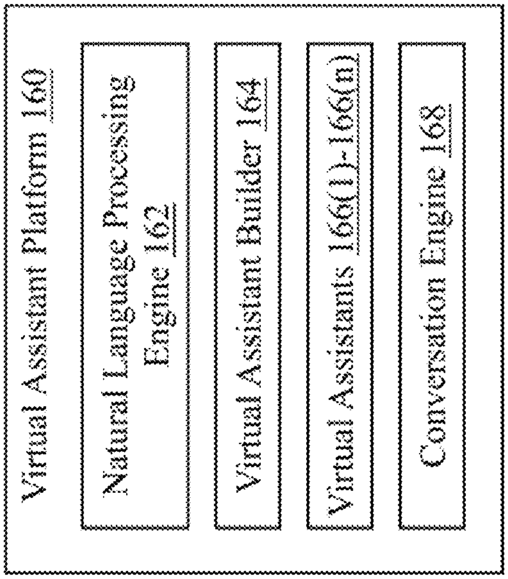
FIG. 1B is a block diagram of the virtual assistant platform of the virtual assistant server illustrated in FIG. 1A.

FIG. 1B is a block diagram of the virtual assistant platform 160 of the virtual assistant server 150 illustrated in FIG. 1A. As illustrated in FIG. 1B, the virtual assistant platform 160 comprises instructions or data corresponding to a natural language processing (NLP) engine 162, a virtual assistant builder 164, one or more virtual assistants 166(1)-166(*n*), and a conversation engine 168, although other types and/or numbers of instructions or data in the form of programs, functions, methods, procedures, definitions, subroutines, modules, or structured or unstructured text, may be stored on the virtual assistant platform 160. Examples of the steps or functions performed when the programmed instructions stored in the memory 154 are executed are illustrated and described by way of the figures and description associated with the examples herein.

The NLP engine 162 performs natural language understanding and natural language generation tasks. The NLP engine 162 may incorporate technologies or capabilities such as machine learning, semantic rules, component relationships, neural networks, rule-based engines, or the like. The NLP engine 162 interprets one or more user utterances received from the one or more user devices 110(1)-110(*n*), to identify one or more use cases of the one or more user utterances or one or more entities in the one or more user utterances and generates one or more responses to the one or more user utterances. The use case of a user utterance is a textual representation of what the user wants the virtual assistant to do. The one or more entities in the user utterance are, for example, parameters, fields, data, or words required by the virtual assistant to fulfill the use case. For example, in the user utterances-"Book me a flight to Orlando for next Sunday", the use case is "Book Flight", and the entities are "Orlando" and "Sunday".

The NLP engine 162 also creates and executes language models corresponding to the one or more virtual assistants 166(1)-166(*n*). In one example, the language models classify the one or more user utterances into one or more use cases configured for the one or more virtual assistants 166(1)-166(*n*) based on the configuration and/or training added to the one or more virtual assistants 166(1)-166(*n*) by the one or more developers at the one or more developer device 130(1)-130(*n*) using the virtual assistant builder 164, although other types and/or numbers of functions may be performed by the language models in other configurations. Also, the NLP engine 162 may use one or more pre-defined and/or custom-trained language models. The language models may be machine learning models, rule-based models, predictive models, neural network-based models, semantic models, component relationship based models, LLMs, or artificial intelligence based models, although there may be other types and/or numbers of language models in other configurations. In one example, the virtual assistant server 150 may determine, based on a configuration, when to use the language models created by the NLP engine 162 and when to use the one or more LLMs created, hosted, and/or managed by the virtual assistant server 150 or the external server 170.

Although not illustrated, the virtual assistant platform 160 may also comprise a sentiment classification model which processes the one or more user utterances received from the one or more user devices 110(1)-110(*n*) as part of the conversation to determine and classify a sentiment of the user (e.g., positive, negative, neutral). In one example, one or more enterprise users may create, train, deploy, manage and optimize the sentiment classification model as a machine learning model. The one or more enterprise users may train the sentiment classification model using labeled train data sets. In another example, instead of using the sentiment classification model, the one or more enterprise users may configure an API call to an LLM such as, for example, OpenAI, to determine and/or classify the sentiment of the user from the one or more user utterances.

The virtual assistant builder 164 of the virtual assistant platform 160 may be served from and/or hosted on the virtual assistant server 150 and may be accessible as a website, a web application, or a software-as-a-service (SaaS) application. Enterprise users, such as a developer or a business analyst by way of example, may access the functionalities of the virtual assistant builder 164, for example, using web requests, API requests, although the functionalities of the virtual assistant builder 164 may be accessed using other types and/or numbers of methods in other configurations. The one or more developers at the one or more developer devices 130(1)-130(*n*) may design, create, configure, and/or train the one or more virtual assistants 166(1)-166(*n*) using the GUI 132 provided by the virtual assistant builder 164. In one example, the functionalities of the virtual assistant builder 164 may be exposed as the GUI 132 rendered in a web page in the web browser accessible using the one or more developer devices 130(1)-130(*n*), such as a desktop or a laptop by way of example. The one or more developers at the one or more developer devices 130(1)-130(*n*) may interact with user interface (UI) components, such as windows, tabs, widgets, or icons of the GUI 132 rendered in the one or more developer devices 130(1)-130(*n*) to create, train, deploy, manage and/or optimize the one or more virtual assistants 166(1)-166(*n*). The virtual assistant builder 164 described herein can be integrated with different application platforms, such as development platforms or development tools or components thereof already existing in the marketplace, e.g., Facebook® Messenger, Microsoft® Bot Framework, third-party LLM platforms such as Open AI through APIs by way of example.

After the one or more virtual assistants 166(1)-166(*n*) are deployed, the users of the enterprise may communicate with the one or more virtual assistants 166(1)-166(*n*) to, for example, purchase products, raise complaints, access services provided by the enterprise, or to know information about the services offered by the enterprise. Each virtual assistant of the one or more virtual assistants 166(1)-166(*n*) may be configured with one or more use cases for handling user utterances and each of the one or more use cases may be further defined using a dialog flow. In one example, each of the one or more virtual assistants 166(1)-166(*n*) may be configured using other methods, such as software code in other configurations. A dialog flow may refer to a sequence of interactions in a conversation between a user and a virtual assistant. In one example, the dialog flow of a use case associated to the virtual assistant comprises a series of interconnected nodes, for example, an intent node, one or more entity nodes, one or more invoke-LLM nodes, one or more service nodes, one or more confirmation nodes, one or more message nodes, or the like, that define steps to be executed to fulfil the use case. The nodes of the dialog flow may include various types of interactions, such as, for example, questions, prompts, confirmations, and messages, and are configured to gather information from the user, provide information to the user, or perform a specific action. Each node of the dialog flow represents a specific point in the conversation and edges between the nodes represent possible paths that the conversation can take.

For each of the one or more virtual assistants 166(1)-166(*n*), the developer via the virtual assistant builder 164 may provide training data such as: use case labels, out-of-domain use case labels, one or more utterances corresponding to each use case label, business rules, domain knowledge, description of one or more entities, conversation rules comprising: flow rules, digression rules, or the like. The developer may provide training data in the form of text, structured text, code, or the like.

The conversation engine 168 orchestrates the conversations between the one or more users at the one or more user devices 110(1)-110(*n*) and the virtual assistant server 150 by executing the one or more virtual assistants 166(1)-166(*n*). Further, the conversation engine 168 may be responsible for orchestrating a user conversation by communicating with various components of the virtual assistant server 150 to perform various actions (e.g., understanding the user utterance, identify a use case of the user utterance, retrieving relevant data, generating a response to the user utterance, transmitting the response to the user, or the like) and routing data between the components of the virtual assistant server 150. For example, the conversation engine 168 may communicate with the NLP engine 162, the fine-tuned LLM 172, or other components of the virtual assistant server 150 to orchestrate conversations with the users at the one or more user devices 110(1)-110(*n*). Further, the conversation engine 168 may perform state management of each conversation managed by the virtual assistant server 150. In one example, the conversation engine 168 may be implemented as a finite state machine that uses states and state information to orchestrate conversations between the one or more user devices 110(1)-110(*n*) and the virtual assistant server 150. The conversation engine 168 may also manage conversation context of a conversation between the one or more user devices 110(1)-110(*n*) and the one or more virtual assistants 166(1)-166(*n*). The conversation context may be defined as a memory of the conversation comprising message turns between the user at the user device 110(1) and the virtual assistant 166(1). The conversation context may comprise, for example, the identified use case from one or more user utterances, one or more identified entities from the one or more user utterances, identified language, or any other information based on the use case.

Further, the conversation engine 168 may manage digressions or interruptions provided by the users at the one or more user devices 110(1)-110(*n*) during the conversations with the one or more virtual assistants 166(1)-166(*n*). In one example, the conversation engine 168 and the NLP engine 162 may be configured as a single component. Furthermore, the conversation engine 168 may generate and manage conversation transcripts of each of the conversations managed by the virtual assistant server 150 between the one or more users at the one or more user devices 110(1)-110(*n*) and the one or more virtual assistants 166(1)-166(*n*). In one example, the virtual assistant server 150 may store the conversation transcripts generated by the conversation engine 168 in the memory 154 or any other database hosted and/or managed on the virtual assistant server 150. In another example, the conversation transcripts generated by the conversation engine 168 may be stored on one or more databases or on cloud storage(s) that are external to the virtual assistant server 150.

FIG. 2 is a flowchart of an exemplary method 200 for transmitting one or more interim responses to a user by the virtual assistant server 150 of FIG. 1A. The exemplary method 200 may be performed by the virtual assistant server 150 illustrated in the environment 100 of FIG. 1A. The exemplary method 200 may be performed by the virtual assistant server 150 during a conversation between the user at the user device 110(1) and the virtual assistant 166(1) hosted and/or managed by the virtual assistant server 150. The virtual assistant server 150 may interact with other components of the environment 100 to perform the steps of the exemplary method 200. In FIG. 2, the ordering of steps of the method 200 is exemplary and any other ordering of the steps may be possible, not all the steps may be required, and in some implementations, some steps may be omitted, or other steps may be added.

At step 202, the virtual assistant server 150 executes a dialog flow associated with a use case determined from a user utterance received from the user device 110(1) associated with the user as part of a conversation between the user and the virtual assistant 166(1) to generate an actual response to the user utterance. The user utterance received from the user device 110(1) may be at least one of: text-based utterance, voice-based utterance, or a combination of text-based and voice-based utterances. In one example, the NLP engine 162 of the virtual assistant server 150, processes and analyzes the user utterance to determine the use case of the user utterance and/or one or more entities. Further, in one example, the sentiment classification model may be used by the virtual assistant server 150, to analyze the user utterance and determine the user sentiment. In another example, the virtual assistant server 150 may make an API call to a general purpose pre-trained LLM hosted and/or managed by a third-party provider such as, for example, OpenAI to process the user utterance and determine the use case of the user utterance, extract the one or more entities from the user utterance, or the user sentiment.

The conversation engine 168 of the virtual assistant server 150 executes the dialog flow associated with the determined use case of the virtual assistant 166(1) to provide the actual response to the user at the user device 110(1). In one example, instead of executing the dialog flow associated with the determined use case of the virtual assistant 166(1), the virtual assistant server 150 may invoke an LLM that is trained to handle use cases configured for the virtual assistant 166(1), by making an API call, to generate the actual response to the user utterance. The actual response may be defined as a substantive and meaningful reply provided by the virtual assistant 166(1) to address the user utterance. The actual response may comprise at least one of: relevant information, one or more answers, one or more knowledge articles, and one or more actions that directly address the user utterance.

At step 204, the virtual assistant server 150 provides a prompt to the fine-tuned LLM 172 comprising: one or more instructions to the fine-tuned LLM 172 to generate a plurality of interim responses to be transmitted to the user device 110(1), and input data required by the fine-tuned LLM 172 to generate the plurality of interim responses. An interim response is a temporary response that acknowledges the user utterance without providing a definitive solution or answer. The interim response may comprise: one or more phrases, one or more statements, or one or more comments that are sent to the user by the virtual assistant server 150 during the conversation to maintain user's interest in the conversation and keep the user engaged while the actual response is generated to address the user utterance. In one example, the interim response may comprise a description of one or more steps, tasks, or actions performed in the dialog flow to generate the actual response.

An interim response may be an audio response, a text response, a visual response, or any combination thereof. In one example, for each utterance received from the user device 110(1), the virtual assistant server 150 may prompt the fine-tuned LLM 172 to generate the plurality of interim responses. The virtual assistant server 150 may receive the plurality of interim responses to be sent to the user device 110(1) from the fine-tuned LLM 172. In another example, the one or more enterprise users may configure the dialog flow associated to the use case of the virtual assistant 166(1) such that the virtual assistant server 150 prompts the fine-tuned LLM 172 to receive the plurality of interim responses to be sent to the user device 110(1) only when the execution of the dialog flow associated to the use case reaches one or more specific nodes such as, for example, a service node, a script node, or the like, where the actual response generation might be delayed.

The input data provided to the fine-tuned LLM 172 comprises at least one of: a use case context, the use case, a user context, a conversation transcript, a conversation state, a conversation state process description, or a user sentiment, although any other information may be included in the prompt based on the use case. The use case context may comprise a brief description of the use case to help the fine-tuned LLM 172 understand the purpose of the conversation between the user and the virtual assistant 166(1). The use case context, for example, is static and may be predefined by the developer in the API call configuration of the fine-tuned LLM 172. The user context may comprise information about the user interacting with the virtual assistant 166(1) such as, for example, the user preferences, past interactions of the user with the virtual assistant server 150, user account type information (e.g., gold user, platinum user), and any other information that helps the virtual assistant server 150 and/or the fine-tuned LLM 172 to personalize the conversation and provide tailored assistance to the user. The conversation state process description comprises a brief description of one or more steps, tasks, or actions of a backend process of the conversation state executed by the virtual assistant server 150 while the conversation with the user is ongoing. The backend process may include tasks such as, for example, data retrieval, data processing, calculations, database queries, external API calls, or any other tasks required to generate the actual response to the user utterance. The conversation state process description may be provided by the developer at the developer device 130(1) in natural language text while configuring the conversation states (i.e., nodes) of the dialog flow of the use case of the virtual assistant 166(1) via the GUI 132 of the virtual assistant builder 164, as illustrated in the exemplary table of FIG. 3A.

As the fine-tuned LLM 172 generates the plurality of interim responses based on at least the use case context, the use case, the conversation transcript, the conversation state, the conversation state process description, or the user sentiment, the plurality of interim responses generated would be contextually relevant, natural, and human-like when compared to the interim responses generated based on predefined templates.

Further, in one example, the fine-tuned LLM 172 may determine a transmission order of the plurality of interim responses to be transmitted to the user device 110(1) based on the one or more steps, tasks, or actions performed as part of the backend process of the corresponding conversation state currently executed and provided in the prompt. Each of the ordered plurality of interim responses informs the user about the one or more of the backend steps, tasks, or actions that are executed by the virtual assistant server 150 in the process of generating the actual response. In another example, the fine-tuned LLM 172 may determine the transmission order of the plurality of interim responses to be transmitted to the user device 110(1) based on an empathy level of each of the plurality of interim responses. In this example, the fine-tuned LLM 172 may order the plurality of interim responses such that the empathy level increases from one interim response to a successive interim response of the ordered plurality of interim responses transmitted to the user device 110(1) to address a delay in the generation of the actual response. This ordering of the plurality of interim responses ensures the user is informed about the ongoing activity and the user feels attended to, even if the virtual assistant 166(1) takes more time to generate the actual response.

The fine-tuned LLM 172 may be trained on a dataset of input-output pairs as illustrated in FIG. 3B. FIG. 3B is a table of exemplary training data that may be used for training the fine-tuned LLM 172. The input in the training data to the fine-tuned LLM 172 is hereinafter referred to as the "prompt to the fine-tuned LLM". As illustrated in FIG. 3B, the prompt to the fine-tuned LLM may comprise, for example, the use case context, the one or more instructions to the fine-tuned LLM 172 to generate the plurality of interim responses, the use case, the user sentiment, the conversation state, the conversation state process description, and the conversation transcript. Typically, a prompt may be defined as a textual feed provided to the fine-tuned LLM 172 to set the context and provide input information for the fine-tuned LLM 172 to understand the user's intent and generate an output. In one example, for a given use case, the developer at the developer device 130(1) may pre-configure a prompt template for the fine-tuned LLM 172 and the virtual assistant server 150 may use the prompt template to provide the prompt to the LLM 172. The prompt template may comprise data such as, for example, the use case context, the one or more instructions to the fine-tuned LLM 172 to generate the plurality of interim responses, the use case, and placeholders that indicate the virtual assistant server 150 to fill the information that changes based on the progress of the conversation comprising: the user sentiment, the conversation state, the conversation state process description, and the conversation transcript. The conversation state may be defined as a name or description of one of the series of interconnected nodes of the dialog flow of the use case that is currently executed during the conversation between the user at the user device 110(1) and the virtual assistant 166(1). For example, for a use case-"order tracking", during the conversation if the conversation engine 168 is currently executing a service node of the dialog flow of the use case-"order tracking" to fetch order details from a backend database, the conversation state that is provided to the fine-tuned LLM 172 by the virtual assistant server 150 may be "order_tracking_service node".

Further, as illustrated in FIG. 3B, the output in the training data to the fine-tuned LLM 172 comprises an expected output from the fine-tuned LLM 172, i.e., the plurality of interim responses to be generated based on the provided prompt. Although not illustrated in FIG. 3B, other types and/or numbers of input-output pairs may be used in other configurations to train the fine-tuned LLM 172. The fine-tuned LLM 172 uses this training data to learn patterns and relationships in the training data, generates a plurality of interim responses based on the learned patterns and relationships and outputs the plurality of interim responses to the virtual assistant server 150.

Referring back to FIG. 2, at step 206, the virtual assistant server 150 transmits one or more of the plurality of interim responses received from the fine-tuned LLM 172 to the user device 110(1) in an order determined by the fine-tuned LLM 172 until the actual response is generated. In one example, the one or more of the plurality of interim responses received from the fine-tuned LLM 172 are transmitted to the user device 110(1) when there is a delay to generate the actual response and the delay to generate the actual response is greater than a first threshold time period. The first threshold time period may be pre-defined by the enterprise user while configuring the virtual assistant 166(1) or while configuring the dialog flow of the use case associated to the virtual assistant 166(1). In this example, immediately after receiving the user utterance from the user device 110(1), the virtual assistant server 150 initiates a first time period and monitors if the actual response to the user utterance is generated before the first time period reaches the first threshold time period. If the actual response to the user utterance is not generated before the first time period reaches the first threshold time period, the virtual assistant server 150 transmits a first one of the one or more of the plurality of interim responses received from the fine-tuned LLM 172 to the user device 110(1) immediately after the first time period reaches the first threshold time period.

In the above example of the "order tracking" use case, when the conversation engine 168 is executing the service node of the dialog flow, there might be a delay in, for example, making the API call to the backend database and fetching order details from the backend database due to one or more factors such as, for example, network congestion, network latency, network outage, system overload, or the like. In this example, if the order details are not fetched from the backend database before the first time period reaches the first threshold time period, the virtual assistant server 150 transmits the first one of the one or more of the plurality of interim responses received from the fine-tuned LLM 172 to the user device 110(1) immediately after the first time period reaches the first threshold time period.

Subsequently, at step 208, if the actual response has now been generated, then the virtual assistant server 150 transmits the generated actual response to the user utterance to the user device 110(1) subsequent to the transmitting the first one of the one or more of the plurality of interim responses to the user device 110(1). In one example, the generated actual response may be transmitted to the user device 110(1)

immediately after it is generated, although other time periods for this transmission may be used.

In another example, immediately after the first one of the one or more of the plurality of interim responses is transmitted to the user device 110(1), if the actual response has not been generated, then the virtual assistant server 150 initiates a second time period and monitors if the actual response is generated before the second time period reaches a second threshold time period. The second threshold time period may be, for example, less than the first threshold time period. In this example, if the actual response is generated before the second time period reaches the second threshold time period, then the virtual assistant server 150 transmits the generated actual response to the user device 110(1) immediately after the second time period reaches the second threshold time period. Further, in this example, if the actual response is not generated before the second time period reaches the second threshold time period, then the virtual assistant server 150 transmits the second one of the one or more of the plurality of interim responses to the user device 110(1) immediately after the second time period reaches the second threshold time period. Further, in this example, this iterative process continues sequentially for each of the plurality of interim responses so that if the actual response is not generated each time before the second time period reaches the second threshold time period, then the virtual assistant server 150 transmits each successive interim response from a second one of the one or more of the plurality of interim responses to the user device 110(1) after the second time period reaches the second threshold time period. Further in this example, the second time period is the same for each of the successive interim responses, but in other examples other time periods could be used, such as reducing the time period before sending the next interim response if the actual response is not generated.

In one example, if the actual response is not generated after transmitting to the user device 110(1) all of the plurality of interim responses received from the fine-tuned LLM 172, then the virtual assistant server 150 may escalate and/or transfer the conversation to a human agent of a plurality of human agents of an enterprise for addressing the user utterance. In this example, the virtual assistant server 150 may place or move the conversation of the user into a queue of one of the plurality of human agents. Further, the virtual assistant server 150 may provide to the human agent information such as, for example, a reason for the escalation, a transcript of the conversation, user profile of the user, the use case determined, the user sentiment, the conversation state, history of user interactions with the virtual assistant server 150, or any other information that helps the human agent in understanding and addressing the user utterance. Furthermore, in this example, while the conversation is escalated to the human agent, the virtual assistant server 150 may transmit one or more interim responses to the user device 110(1) comprising: a reason for the escalation, an approximate time in which the human agent would start the conversation with the user, or the like.

Figure 4A:
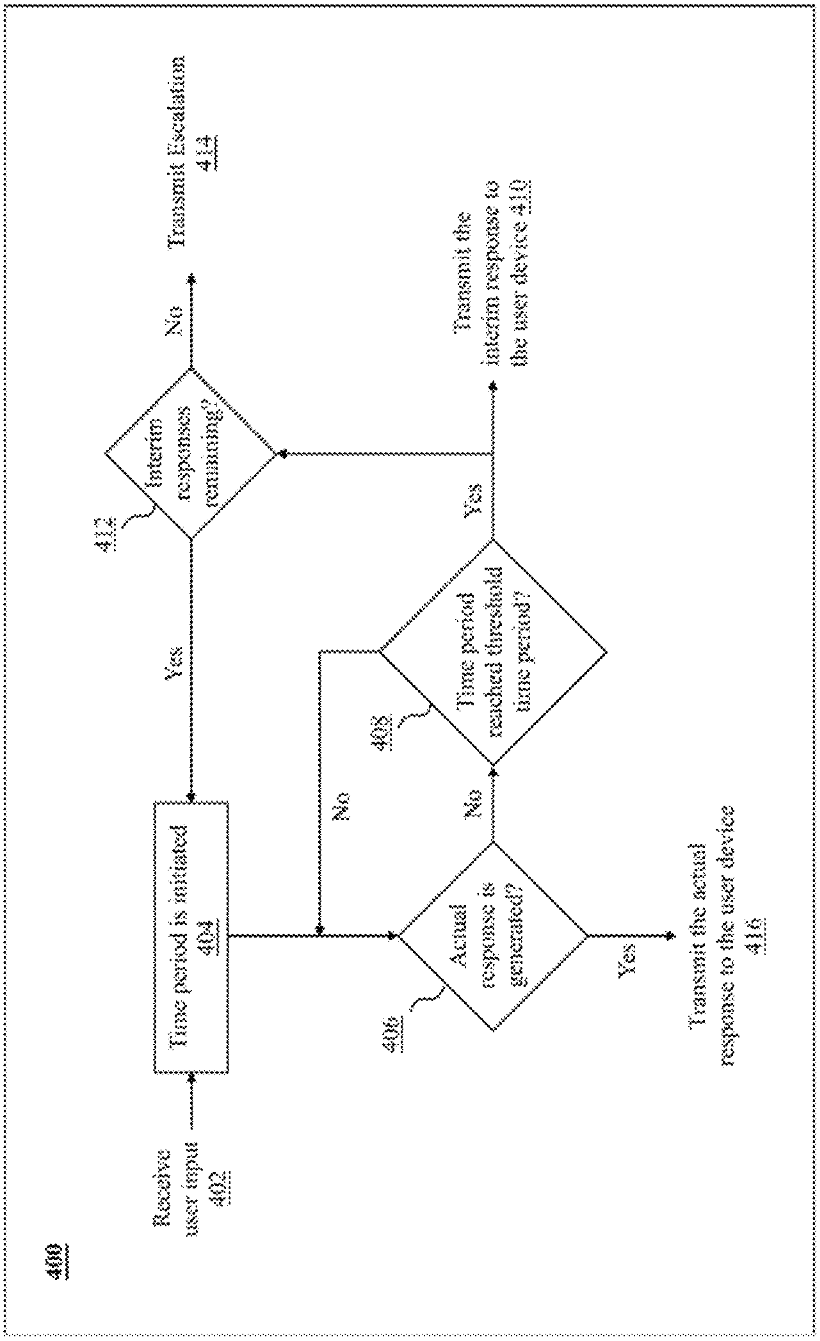
FIG. 4A is an example flowchart illustrating an exemplary method for generating and using interim responses in a conversation managed by the virtual assistant server of FIG. 1A.

Referring to FIG. 4A, an example of a flowchart 400 illustrating an exemplary method for generating and using interim responses in a conversation managed by the virtual assistant server of FIG. 1A. As illustrated in FIG. 4A, at step 402 a user utterance is received by the virtual server 150 from the user device 110(1) in this example.

Next, at step 404, the virtual assistant server 150 initiates a time period. In this example, the time period initiated for the first instance is a first threshold time period and then for subsequent iterations a second threshold time period is utilized, although other time periods can be used, such as the same time period or time periods that are progressively shorter each time.

At step 406, the virtual server 150 monitors to determine if an actual response to the user utterance is generated. If the virtual server 150 determines that an actual response to the user utterance has been generated, then the Yes branch is taken to step 416. In step 416, the virtual server 150 transmits the generated actual response to the user device 110(1) in this example. If the virtual server 150 determines that an actual response to the user utterance has not been generated, then the No branch is taken to step 408.

At step 408, the virtual server 150 determines if the monitored threshold time period has been reached. As noted earlier, in this example the virtual server 150 uses the first threshold time period in the determination on whether to send the first one of the interim responses and then for any subsequent ones uses the second threshold time period which is shorter than the first threshold time period in the determination on whether to send the first one of the interim responses. If in step 408, the virtual server 150 determines the monitored threshold time period has not been reached, then the virtual server 150 takes the No branch back to step 406 to determine if the actual response has been generated as described earlier.

If in step 408, the virtual server 150 determines the monitored threshold time period has been reached, then the virtual server 150 takes the Yes branch to step 410. In step 410, the virtual server transmits the next one in the sequence of interim responses to the user device 110(1) in this example.

Next, at step 412 the virtual server 150 determines if there are any remaining interim responses which have not been transmitted. If at step 412 the virtual server 150 determines there are not any remaining interim responses which have not been transmitted, then the No branch is taken to step 414. In step 414, the virtual server 150 can transmit a communication escalating the issue to the one or more human agents of the plurality of human agents, although other types of actions could be initiated.

If at step 412 the virtual server 150 determines there are remaining interim responses which have not been transmitted, then the Yes branch is taken back to step 404 where the virtual server 150 initiates another time period, in this example the second threshold time period, although other time periods could be initiated.

Figure 4B:
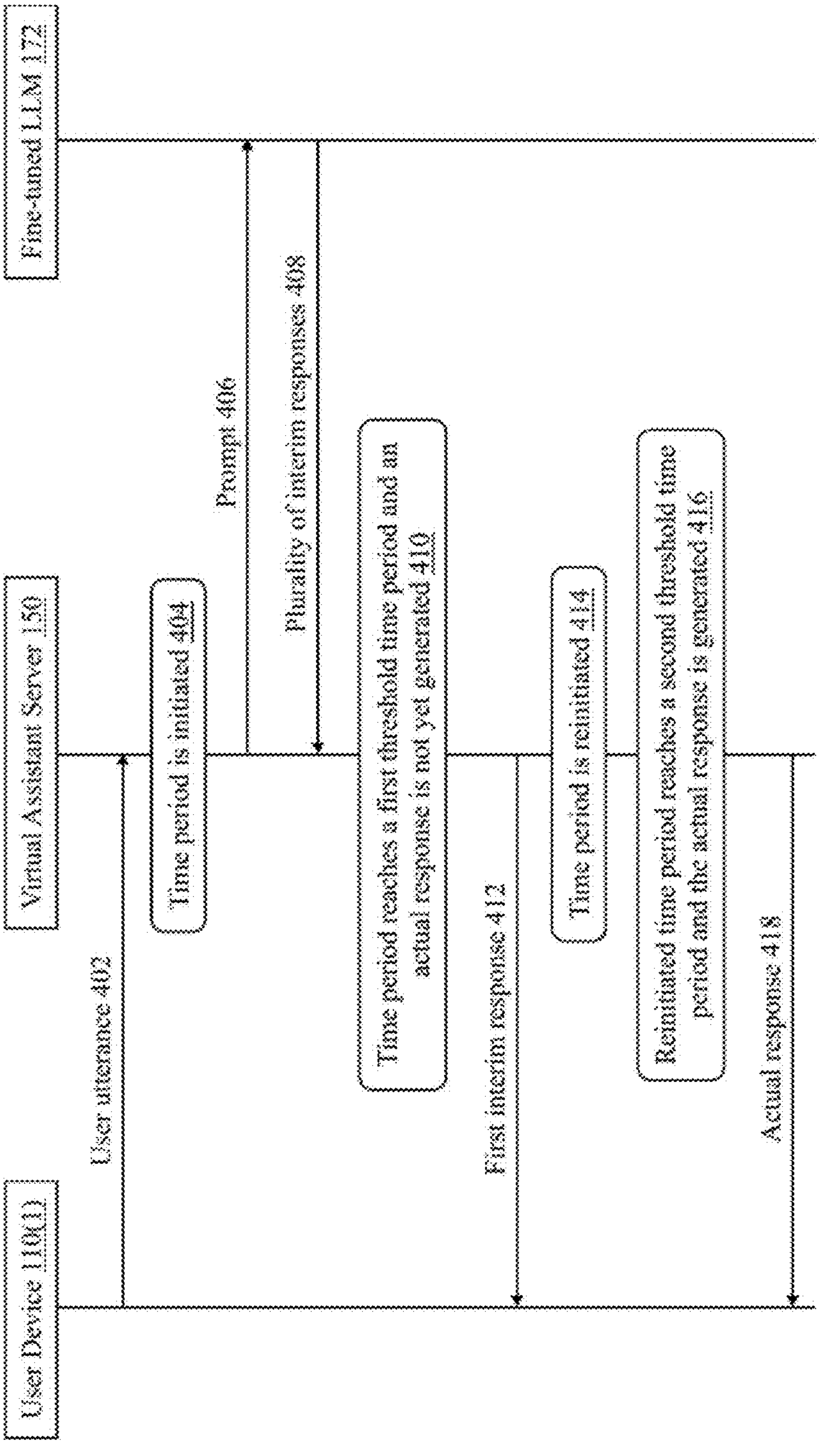
FIGS. 4B and 4C are sequence diagrams illustrating exemplary methods for using interim responses in conversations managed by the virtual assistant server of FIG. 1A.

Referring to FIG. 4B, a sequence diagram illustrating an exemplary method for using interim responses in a conversation managed by the virtual assistant server 150 of FIG. 1A. In one example, the conversation may be a text-based conversation, a voice-based conversation, or a combination of both the text and the voice. It may be understood that FIG. 4B depicts a few steps involved in the conversation between the user at the user device 110(1), the virtual assistant server 150 and the fine-tuned LLM 172, although other types and/or numbers of steps may be performed in other configurations. Further, it may be understood that the steps illustrated and described in FIG. 4B do not have to take place in the sequence illustrated.

As illustrated in exemplary method in FIG. 4B, at step 402, the virtual assistant server 150 receives a user utterance from the user device 110(1). After receiving the user utterance from the user device 110(1), at step 404, the virtual assistant server 150 initiates a time period. At step 406, the virtual assistant server 150 provides a prompt to the fine-tuned LLM 172 to generate a plurality of interim responses. At step 408, the virtual assistant server 150 receives the plurality of interim responses from the fine-tuned LLM 172. At step 410, the virtual assistant server 150 determines that the time period (initiated at step 404) reached a first threshold time period and the actual response to the user utterance is not yet generated. At step 412, the virtual assistant server 150 transmits a first interim response of the plurality of interim responses received from the fine-tuned LLM 172 to the user device 110(1).

Further, as illustrated in exemplary method in FIG. 4B, upon transmitting the first interim response to the user device 110(1), at step 414, the virtual assistant server 150 reinitiates the time period and monitors the reinitiated time period until a second threshold time period is reached. At step 416, the virtual assistant server 150 determines that the time period (reinitiated at step 414) reached the second threshold time period and the actual response to the user utterance is generated. Subsequently, at step 418, the virtual assistant server 150 transmits the generated actual response to the user device 110(1) immediately after the reinitiated time period reaches the second threshold time period. In one example, instead of transmitting the generated actual response to the user device 110(1) after the reinitiated time period reaches the second threshold time period, the virtual assistant server 150 may transmit the generated actual response to the user device 110(1) immediately after the actual response is generated.

Figure 4C:
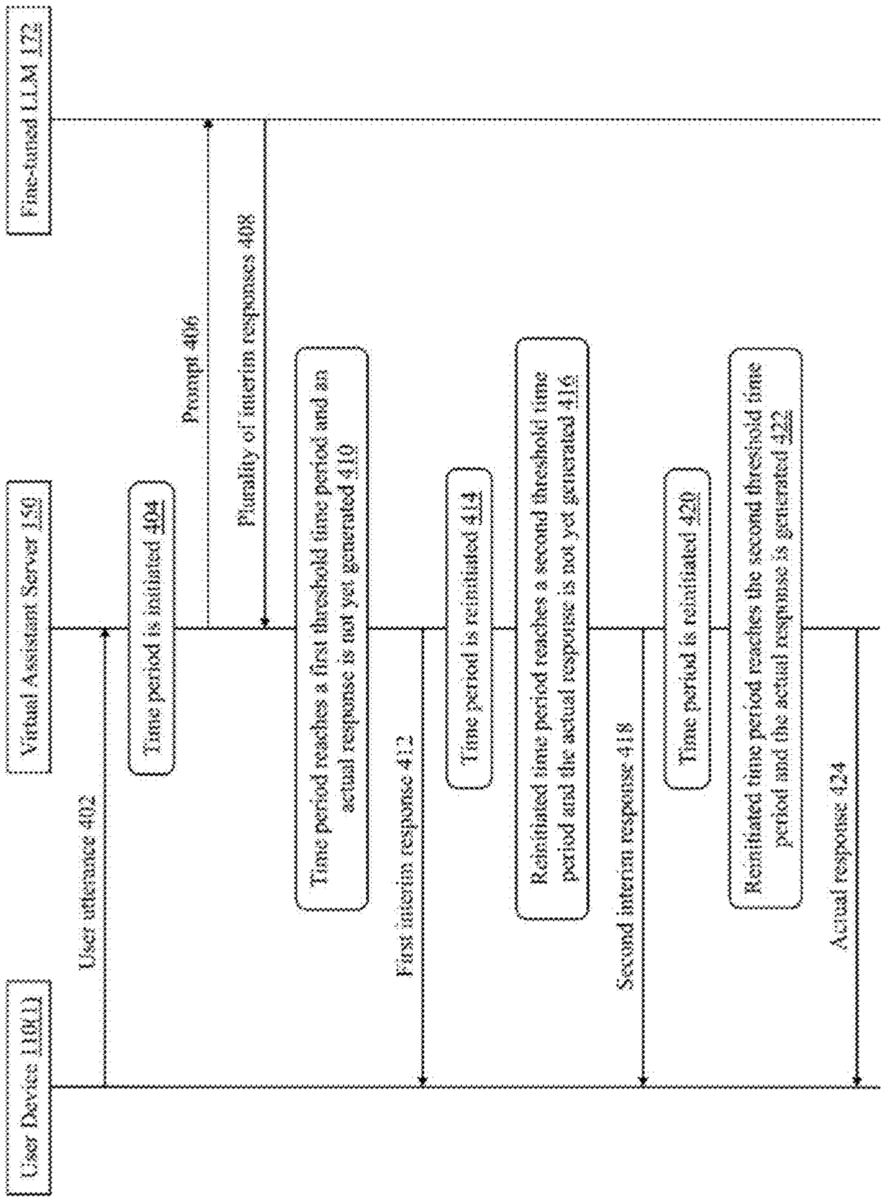

Referring to FIG. 4C, a sequence diagram illustrating another exemplary method for using interim responses in a conversation managed by the virtual assistant server 150 of FIG. 1A. It may be understood that FIG. 4C depicts a few steps involved in the conversation between the user at the user device 110(1), the virtual assistant server 150 and the fine-tuned LLM 172, although other types and/or numbers of steps may be performed in other configurations. Further, it may be understood that the steps illustrated and described in FIG. 4C do not have to take place in the sequence illustrated.

As illustrated in exemplary method in FIG. 4C, upon transmitting the first interim response to the user device 110(1), at step 414, the virtual assistant server 150 reinitiates the time period and monitors the reinitiated time period until a second threshold time period is reached. At step 416, the virtual assistant server 150 determines that the time period (reinitiated at step 414) reached the second threshold time period and the actual response to the user utterance is not yet generated. Thus, at step 418, the virtual assistant server 150 transmits a second interim response of the plurality of interim response received from the fine-tuned LLM 172 to the user device 110(1). Further, upon transmitting the second interim response to the user device 110(1), at step 420, the virtual assistant server 150 once again reinitiates the time period and monitors the reinitiated time period until the second threshold time period is reached. At step 422, the virtual assistant server 150 determines that the time period (reinitiated at step 420) reached the second threshold time period and the actual response to the user utterance is generated. Subsequently, at step 424, the virtual assistant server 150 transmits the generated actual response to the user device 110(1) immediately after the reinitiated time period reaches the second threshold time period. In the examples of FIGS. 4B and 4C, the second threshold time period may be less than or equal to the first threshold time period.

In accordance with the methods, systems, and non-transitory computer-readable mediums described above, by employing the LLM that is trained and/or fine-tuned to generate interim responses during user-virtual assistant conversations, the virtual assistant server may transmit the interim responses to the users that are more expressive, empathetic, and contextually relevant, thus ensuring a more personalized and engaging user experience. Further, incorporating the present invention into existing virtual assistant platforms offers significant advantages such as, for example, improved user retention and satisfaction, and enhanced user trust in conversing with the virtual assistants.

Having thus described the basic concept of the invention, it will be rather apparent to those skilled in the art that the foregoing detailed disclosure is intended to be presented by way of example only and is not limiting. Various alterations, improvements, and modifications will occur and are intended for those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A method comprising:

executing, by a virtual assistant server, a dialog flow comprising a series of interconnected nodes including at least one of: an intent node, one or more entity nodes, one or more invoke-LLM nodes, one or more service nodes, one or more confirmation nodes, or one or more message nodes associated with a use case determined from a user input received from a user device associated with a user as part of an online conversation between the user and a virtual assistant to generate an actual response to the user input;

providing, by the virtual assistant server, a prompt to a large language model (LLM) comprising:

one or more instructions to the LLM to generate a plurality of interim responses to be transmitted to the user device, wherein the plurality of interim responses are generated by the LLM using a probabilistic approach to language generation based on patterns learned from training data comprising input-output pairs of prompts and expected interim responses; and input data required by the LLM to generate the plurality of interim responses, wherein the input data comprises: a description of the use case, an identification of a current node of execution of the dialog flow, and a description of an action performed at the current node of execution;

transmitting, by the virtual assistant server, one or more of the plurality of interim responses received from the LLM to the user device in an order determined by the LLM prior to generating the actual response; and transmitting, by the virtual assistant server, the generated actual response to the user input to the user device subsequent to the transmitting the one or more of the plurality of interim responses to the user device.

2. The method of claim 1, wherein the input data further comprises: a conversation transcript, a conversation state, and a user sentiment.

3. The method of claim 1, wherein the conversation state is a currently executed one of a plurality of interconnected nodes of the dialog flow of the use case during the online conversation.

4. The method of claim 1, further comprising:

monitoring, by the virtual assistant server, a first time period beginning immediately after receipt of the user input from the user device and for the generation of the actual response; and wherein the transmitting the one or more of the interim responses received from the LLM to the user device is based on the monitored first time period and the monitored generation of the actual response.

5. The method of claim 4, wherein a first one of the interim responses received from the LLM is transmitted to the user device when the monitored first time period is beyond a first threshold time period and the monitored generation of the actual response is incomplete.

6. The method of claim 5, wherein a second one of the interim responses received from the LLM is transmitted to the user device when a monitored second time period is beyond a second threshold time period and the monitored generation of the actual response is incomplete, wherein the monitored second time period begins immediately after the transmitting of the first one of the interim responses to the user device.

7. The method of claim 1, wherein the order determined by the LLM is based on execution steps to be performed in a currently executed conversation state of the dialog flow.

8. The method of claim 1, wherein the order determined by the LLM is based on an empathy level of each of the plurality of interim responses.

9. A virtual assistant server comprising:

one or more processors; and a memory coupled to the one or more processors which are configured to execute programmed instructions stored in the memory to:

execute a dialog flow comprising a series of interconnected nodes including at least one of: an intent node, one or more entity nodes, one or more invoke-LLM nodes, one or more service nodes, one or more confirmation nodes, or one or more message nodes associated with a use case determined from a user input received from a user device associated with a user as part of an online conversation between the user and a virtual assistant to generate an actual response to the user input;

provide a prompt to a large language model (LLM) comprising:

one or more instructions to the LLM to generate a plurality of interim responses to be transmitted to the user device, wherein the plurality of interim responses are generated by the LLM using a probabilistic approach to language generation based on patterns learned from training data comprising input-output pairs of prompts and expected interim responses; and input data required by the LLM to generate the plurality of interim responses, wherein the input data comprises: a description of the use case, an identification of a current node of execution of the dialog flow, and a description of an action performed at the current node of execution;

transmit one or more of the plurality of interim responses received from the LLM to the user device in an order determined by the LLM prior to generating the actual response; and transmit the generated actual response to the user input to the user device subsequent to the transmitting the one or more of the plurality of interim responses to the user device.

10. The virtual assistant server of claim 9, wherein the input data further comprises: a conversation transcript, a conversation state, and a user sentiment.

11. The virtual assistant server of claim 9, wherein the conversation state is a currently executed one of a plurality of interconnected nodes of the dialog flow of the use case during the online conversation.

12. The virtual assistant server of claim 9, the one or more processors are further configured to:

monitor a first time period beginning immediately after receipt of the user input from the user device and for the generation of the actual response; and wherein the transmitting the one or more of the interim responses received from the LLM to the user device is based on the monitored first time period and the monitored generation of the actual response.

13. The virtual assistant server of claim 12, wherein a first one of the interim responses received from the LLM is transmitted to the user device when the monitored first time period is beyond a first threshold time period and the monitored generation of the actual response is incomplete.

14. The virtual assistant server of claim 13, wherein a second one of the interim responses received from the LLM is transmitted to the user device when a monitored second time period is beyond a second threshold time period and the monitored generation of the actual response is incomplete, wherein the monitored second time period begins immediately after the transmitting of the first one of the interim responses to the user device.

15. The virtual assistant server of claim 9, wherein the order determined by the LLM is based on execution steps to be performed in a currently executed conversation state of the dialog flow.

16. The virtual assistant server of claim 9, wherein the order determined by the LLM is based on an empathy level of each of the plurality of interim responses.

17. A non-transitory computer-readable medium storing instructions which when executed by one or more processors, causes the one or more processors to:

execute a dialog flow comprising a series of interconnected nodes including at least one of: an intent node, one or more entity nodes, one or more invoke-LLM nodes, one or more service nodes, one or more confirmation nodes, or one or more message nodes associated with a use case determined from a user input received from a user device associated with a user as part of an online conversation between the user and a virtual assistant to generate an actual response to the user input;

provide a prompt to a large language model (LLM) comprising:

one or more instructions to the LLM to generate a plurality of interim responses to be transmitted to the user device, wherein the plurality of interim responses are generated by the LLM using a probabilistic approach to language generation based on patterns learned from training data comprising input-output pairs of prompts and expected interim responses; and input data required by the LLM to generate the plurality of interim responses, wherein the input data comprises: a description of the use case, an identification of a current node of execution of the dialog flow, and a description of an action performed at the current node of execution;

transmit one or more of the plurality of interim responses received from the LLM to the user device in an order determined by the LLM prior to generating the actual response; and transmit the generated actual response to the user input to the user device subsequent to the transmitting the one or more of the plurality of interim responses to the user device.

18. The non-transitory computer-readable medium of claim 17, wherein the input data further comprises: a conversation transcript, a conversation state, and a user sentiment.

19. The non-transitory computer-readable medium of claim 17, wherein the conversation state is a currently executed one of a plurality of interconnected nodes of the dialog flow of the use case during the online conversation.

20. The non-transitory computer-readable medium of claim 17, further comprising instructions which when executed by the one or more processors, causes the one or more processors to:

monitor a first time period beginning immediately after receipt of the user input from the user device and for the generation of the actual response; and wherein the transmitting the one or more of the interim responses received from the LLM to the user device is based on the monitored first time period and the monitored generation of the actual response.

21. The non-transitory computer-readable medium of claim 20, wherein a first one of the interim responses received from the LLM is transmitted to the user device when the monitored first time period is beyond a first threshold time period and the monitored generation of the actual response is incomplete.

22. The non-transitory computer-readable medium of claim 21, wherein a second one of the interim responses received from the LLM is transmitted to the user device when a monitored second time period is beyond a second threshold time period and the monitored generation of the actual response is incomplete, wherein the monitored second time period begins immediately after the transmitting of the first one of the interim responses to the user device.

23. The non-transitory computer-readable medium of claim 17, wherein the order determined by the LLM is based on execution steps to be performed in a currently executed conversation state of the dialog flow.

24. The non-transitory computer-readable medium of claim 17, wherein the order determined by the LLM is based on an empathy level of each of the plurality of interim responses.

* * * * *